United States Patent
Jiang

(10) Patent No.: US 10,440,638 B2
(45) Date of Patent: Oct. 8, 2019

(54) METHOD, APPARATUS, USER EQUIPMENT AND BASE STATION FOR SENDING AND RECEIVING SYSTEM INFORMATION

(71) Applicant: BEIJING XIAOMI MOBILE SOFTWARE CO., LTD., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/348,498

(22) PCT Filed: Nov. 11, 2016

(86) PCT No.: PCT/CN2016/105493
§ 371 (c)(1),
(2) Date: May 8, 2019

(87) PCT Pub. No.: WO2018/086069
PCT Pub. Date: May 17, 2018

(65) Prior Publication Data
US 2019/0268832 A1    Aug. 29, 2019

(51) Int. Cl.
*H04W 48/14*  (2009.01)
*H04W 48/10*  (2009.01)

(52) U.S. Cl.
CPC .......... *H04W 48/14* (2013.01); *H04W 48/10* (2013.01)

(58) Field of Classification Search
CPC ..... H04W 48/12; H04W 48/16; H04W 48/14; H04W 48/10; H04L 65/4076;
(Continued)

(56) References Cited

U.S. PATENT DOCUMENTS

2003/0179738 A1*  9/2003  Diachina ............... H04W 48/12
                                               370/349
2012/0165058 A1*  6/2012  Hwang ............... H04W 74/006
                                               455/509
(Continued)

FOREIGN PATENT DOCUMENTS

CN     101227706 A    7/2008
CN     101572594 A    11/2009
(Continued)

OTHER PUBLICATIONS

ISA State Intellectual Property Office of the People's Republic of China, International Search Report Issued in Application No. PCT/CN2016/105493, dated Aug. 4, 2017, WIPO, 4 pages.
(Continued)

*Primary Examiner* — Nizar N Sivji
(74) *Attorney, Agent, or Firm* — Arch & Lake LLP

(57) ABSTRACT

Related are a method, an apparatus, user equipment and a base station for sending and receiving SI. The method of receiving SI comprises: in response to receiving first-class SI broadcast by a base station, determining a requesting window, a receiving window and a pilot code of to-be-requested SI, where the requesting window includes P number of time domain sending opportunities for sending a request carrying the pilot code; monitoring a first Q number of time domain sending opportunities within the requesting window to determine whether a request carrying the pilot code is sent from UE to the base station; when no UE sends the request carrying the pilot code, sending the request carrying the pilot code in the (Q+1)-th time domain sending opportunity; and monitoring the receiving window of the to-be-requested SI for the to-be-requested SI sent by the base station.

19 Claims, 10 Drawing Sheets

(58) Field of Classification Search
CPC .. H04L 67/325; H04N 21/4345; H04H 20/59; H04H 20/02; H04H 20/61
See application file for complete search history.

(56) References Cited

U.S. PATENT DOCUMENTS

| | | | | |
|---|---|---|---|---|
| 2014/0153516 | A1* | 6/2014 | Young | H04W 48/12 370/329 |
| 2016/0234735 | A1* | 8/2016 | Kubota | H04W 48/14 |
| 2017/0251500 | A1* | 8/2017 | Agiwal | H04W 4/06 |
| 2017/0311342 | A1* | 10/2017 | You | H04B 7/0695 |
| 2018/0132166 | A1* | 5/2018 | Ishii | H04W 48/12 |

FOREIGN PATENT DOCUMENTS

| | | |
|---|---|---|
| CN | 101651490 A | 2/2010 |
| CN | 101784121 A | 7/2010 |

OTHER PUBLICATIONS

State Intellectual Property Office of the People's Republic of China, Office Action and Search Report Issued in Application No. 2016800014891, dated Jan. 2, 2018, 12 pages. (Submitted with Machine Translation).
State Intellectual Property Office of the People's Republic of China, Office Action and Search Report Issued in Application No. 2016800014891, dated Jun. 12, 2018, 10 pages. (Submitted with Machine Translation).
3rd Generation Partnership Project; Technical Specification Group Radio Access Network; Evolved Universal Terrestrial Radio Access (E-UTRA); Medium Access Control (MAC) protocol specification; 3GPP TS 36321 V15.4.0 (Dec. 2018).
3rd Generation Partnership Project; Technical Specification Group Radio Access Network; Evolved Universal Terrestrial Radio Access (E-UTRA); Radio Resource Control (RRC); Protocol specification; 3GPP TS 36.331 V15.4.0 (Dec. 2018).

* cited by examiner

```
┌─────────────────────────────────────────────────────────────────┐
│ In response to receiving first-class SI broadcasted by a base stationn, determine a │
│ requesting window, a receiving window and a pilot code of to-be-requested SI, where │
│   the the to-be-requested SI belongs to second-class SI, the requesting window     │  101
│  includes P Number of time domain sending opportunities, and each time domain      │
│  sending opportunity corresponds to one sub-frame associated with an opportunity   │
│              for sending a request carrying the pilot code                          │
└─────────────────────────────────────────────────────────────────┘
                                    │
                                    ▼
┌─────────────────────────────────────────────────────────────────┐
│ Monitor a first Q number of time domain sending opportunities within the requesting │  102
│   window to determine whether a request carrying the pilot code is sent from user   │
│         equipment to the base station, where Q is a natural number less than P      │
└─────────────────────────────────────────────────────────────────┘
                                    │
                                    ▼
┌─────────────────────────────────────────────────────────────────┐
│  When it is monitored that no user equipment sends a request carrying the Pilot    │  103
│    code with the first Q number of time domain sending opportunities of the        │
│   requesting window, send the request carrying the pilot code with the (Q+1)-th    │
│                       time domain sending opportunity                               │
└─────────────────────────────────────────────────────────────────┘
                                    │
                                    ▼
┌─────────────────────────────────────────────────────────────────┐
│    Monitor the receiving window of the to-be-requested SI for the to-be-requested SI│  104
│                             sent by the base station                                 │
└─────────────────────────────────────────────────────────────────┘
```

FIG.1A

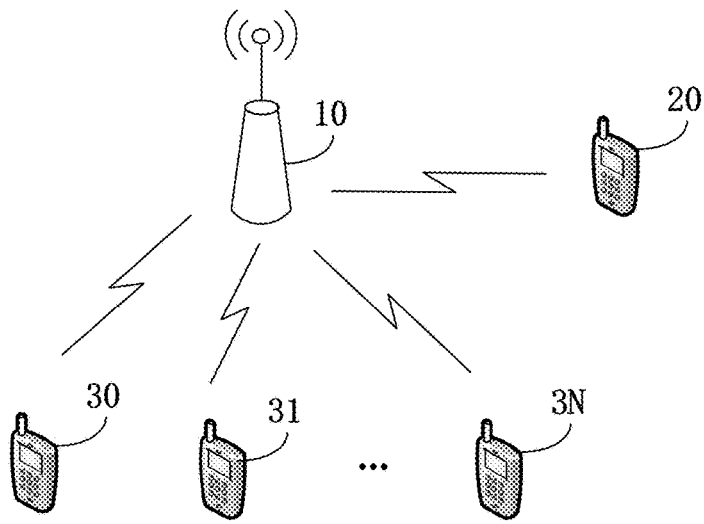

FIG.1B

US 10,440,638 B2

METHOD, APPARATUS, USER EQUIPMENT AND BASE STATION FOR SENDING AND RECEIVING SYSTEM INFORMATION

CROSS REFERENCE TO RELATED APPLICATIONS

The present application is the U.S. national phase of PCT Application No. PCT/CN2016/105493 filed on Nov. 11, 2016, which is incorporated herein by reference in its entirety.

TECHNICAL FIELD

The present disclosure relates to the field of communication technology and more particular to a method, an apparatus, user equipment and a base station for sending and receiving system information.

BACKGROUND

With rapid development of wireless communication technology, a volume of System Information (SI) of Long Term Evolution (LTE) is increasing. Sending SI of LTE by means of periodical broadcasting may increase the power consumption of a base station and decrease the utilization rate of a frequency spectrum resource. In a case of a small quantity of accessing User Equipment (UE), a resource waste problem may occur when the SI of LTE is periodically broadcasted. To alleviate the problems of the resource waste and large power consumption of the base station caused by broadcasting the SI of LTE, operators begin to consider solving the above problems by means of sending SI according to classification.

In the related art, during research and discussion of $5^{th}$ Generation (5G) mobile communication technology projects, SI may be divided into first-class SI and second-class SI, where the first-class SI may include SI relating to cell selection and cell access, and the second-class SI may include SI other than the first-class SI. In the related art, the first-class SI may still be sent by broadcasting; and for the second-class SI, when a particular preamble is received from UE who requesting the second-class SI, SI or an SI combination requested by the UE may be feedbacked in a response.

SUMMARY

To solve the problems in the related art, examples of the present disclosure provide methods, apparatuses, user equipment and base stations for sending and receiving SI to improve the efficiencies of sending and receiving SI between the base station and the user equipment, reduce power consumption of the base station caused by sending SI, and increase a utilization rate of a frequency spectrum resource.

According to a first aspect of examples of the present disclosure, a method of receiving SI is provided, including:

in response to receiving first-class SI broadcasted by a base station, determining a requesting window, a receiving window and a pilot code of to-be-requested SI, where the to-be-requested SI belongs to second-class SI, the requesting window includes P number of time domain sending opportunities, and each time domain sending opportunity corresponds to one subframe associated with an opportunity for sending a request carrying the pilot code;

monitoring a first Q number of time domain sending opportunities within the requesting window to determine whether a request carrying the pilot code is sent from user equipment to the base station, where Q indicates a natural number less than P;

when it is monitored that no user equipment sends the request carrying the pilot code to the base station with the first Q number of time domain sending opportunities of the requesting window, sending the request carrying the pilot code with the (Q+1)-th time domain sending opportunity; and monitoring the receiving window of the to-be-requested SI for the to-be-requested SI sent by the base station.

According to a second aspect of an example of the present disclosure, a method of sending SI is provided, including:

sending first-class SI, where the first-class SI carries scheduling information and requesting window information of second-class SI, the scheduling information is used to determine a receiving window of to-be-requested SI which is applied by user equipment, the requesting window information is used to determine a requesting window of the to-be-requested SI which is applied by the user equipment, and the to-be-requested SI belongs to the second-class SI;

receiving a request carrying a pilot code of the to-be-requested SI sent by the user equipment within the requesting window of the to-be-requested SI; and determining whether to send the to-be-requested SI within the receiving window of the to-be-requested SI according to a number of the requests received within the requesting window of the to-be-requested SI.

According to a third aspect of an example of the present disclosure, an apparatus for receiving SI is provided, including:

a first determining module, configured to determine a requesting window, a receiving window and a pilot code of to-be-requested SI in response to receiving first-class SI broadcasted by a base station, where the to-be-requested SI belongs to second-class SI, the requesting window includes P number of time domain sending opportunities, and each time domain sending opportunity corresponds to one subframe associated with an opportunity for sending a request carrying the pilot code;

a first monitoring module, configured to monitor a first Q number of time domain sending opportunities within the requesting window to determine whether a request carrying the pilot code is sent from user equipment to the base station, where Q indicates a natural number less than P, and the requesting window is determined by the first determining module;

a first sending module, configured to send the request carrying the pilot code with the (Q+1)-th time domain sending opportunity when the first monitoring module monitors that no user equipment sends the request carrying the pilot code to the base station with the first Q number of time domain sending opportunities of the requesting window; and a second monitoring module, configured to monitor the receiving window of the to-be-requested SI for the to-be-requested SI sent by the base station.

According to a fourth aspect of an example of the present disclosure, an apparatus for sending SI is provided, including:

a second sending module, configured to send first-class SI, where the first-class SI carries scheduling information and requesting window information of second-class SI, the scheduling information is used to determine a receiving window of to-be-requested SI which is applied by user equipment, the requesting window information is used to determine a requesting window of the to-be-requested SI which is applied by the user equipment, and the to-be-requested SI belongs to the second-class SI;

a first receiving module, configured to receive a request carrying a pilot code of the to-be-requested SI sent by the user equipment within the requesting window of the to-be-requested SI; and a second determining module, configured to determine whether to send the to-be-requested SI within the receiving window of the to-be-requested SI according to a number of the requests received within the requesting window of the to-be-requested SI.

According to a fifth aspect of an example of the present disclosure, user equipment is provided, including:

a processor; and a memory for storing instructions executable by the processor;

where the processor is configured to:

in response to receiving first-class SI broadcasted by a base station, determine a requesting window, a receiving window and a pilot code of to-be-requested SI, where the to-be-requested SI belongs to second-class SI, the requesting window includes P number of time domain sending opportunities, and each time domain sending opportunity corresponds to one subframe associated with an opportunity for sending a request carrying the pilot code;

monitor a first Q number of time domain sending opportunities within the requesting window to determine whether a request carrying the pilot code is sent from user equipment to the base station, where Q indicates a natural number less than P;

when it is monitored that no user equipment sends the request carrying the pilot code to the base station with the first Q number of time domain sending opportunities of the requesting window, send the request carrying the pilot code with the (Q+1)-th time domain sending opportunity; and monitor the receiving window of the to-be-requested SI for the to-be-requested SI sent by the base station.

According to a sixth aspect of an example of the present disclosure, a base station is provided, including:

a processor; and a memory for storing instructions executable by the processor;

where the processor is configured to:

send first-class SI, where the first-class SI carries scheduling information and requesting window information of second-class SI, the scheduling information is used to determine a receiving window of to-be-requested SI which is applied by user equipment, the requesting window information is used to determine a requesting window of the to-be-requested SI which is applied by the user equipment, and the to-be-requested SI belongs to the second-class SI;

receive a request carrying a pilot code of the to-be-requested SI sent by the user equipment within the requesting window of the to-be-requested SI; and determine whether to send the to-be-requested SI within the receiving window of the to-be-requested SI according to a number of the requests received within the requesting window of the to-be-requested SI.

The technical solutions provided by examples of the present disclosure may include the following beneficial effects.

According to the above technical solution, when receiving the first-class SI periodically broadcasted by the base station, the UE may be controlled to firstly monitor a corresponding requesting window to determine whether another UE requests the to-be-requested SI. If no other UE sends the request requesting the to-be-requested SI, the UE may then send the request carrying the pilot code of the to-be-requested SI to the base station. Thus, the request sent by another UE is used for the to-be-requested SI, and the power consumption of the UE is reduced. The performances of sending and receiving SI are greatly improved since the base station does not need to periodically broadcast the second-class SI.

It is to be understood that the above general descriptions and the following detailed descriptions are merely illustrative and explanatory and are not intended to limit the present disclosure.

BRIEF DESCRIPTION OF DRAWINGS

The accompanying drawings, which are incorporated in and constitute a part of the present specification, illustrate examples coincident with the present disclosure and serve to explain the principles of the present disclosure together with the specification.

FIG. 1A is a flowchart illustrating a method of receiving SI according to an example of the present disclosure.

FIG. 1B is a schematic diagram illustrating a scenario of a method of sending and receiving SI according to an example of the present disclosure.

DETAILED DESCRIPTION

Figure 2A:
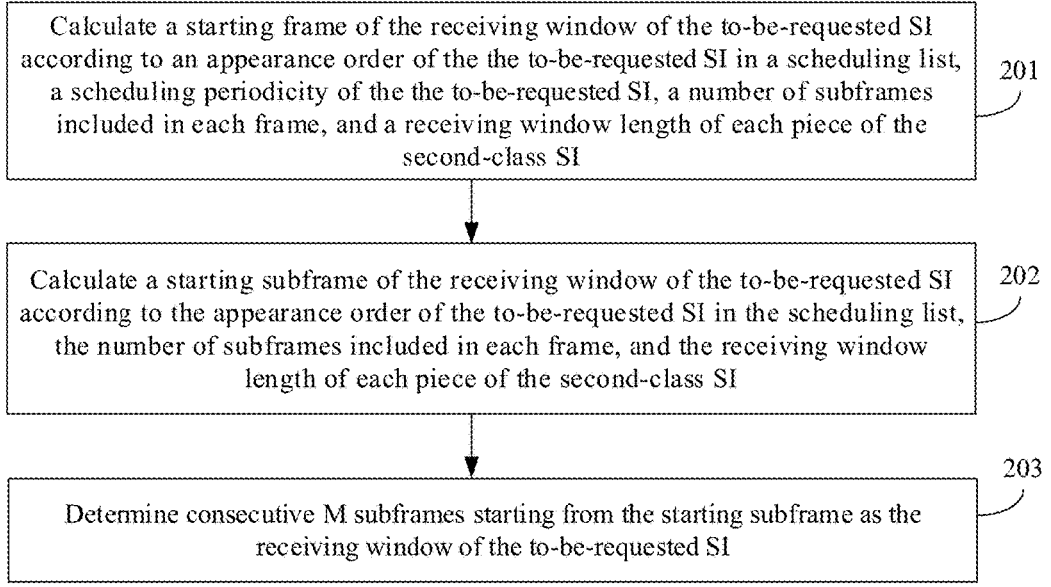
FIG. 2A is a first flowchart illustrating a method of receiving SI according to another example of the present disclosure.

Hereinafter, embodiments will be described in detail, examples of which are shown in the drawings. When the following descriptions refer to the drawings, the same numerals in the different drawings denote the same or similar elements unless otherwise indicated. The embodiments described in the following examples are not representative of all embodiments coincident with the present disclosure. Rather, they are merely examples of apparatuses and methods coincident with some aspects of the present disclosure as detailed in the appended claims.

FIG. 1A is a flowchart illustrating a method of receiving system information (SI) according to an example of the present disclosure. FIG. 1B is a schematic diagram illustrating a scenario of a method of sending and receiving SI according to an example of the present disclosure. The method of receiving SI may be applied to User Equipment (UE), and includes the following steps 101-104 as shown in FIG. 1A.

At step 101, in response to receiving first-class SI broadcasted by a base station, a requesting window, a receiving window and a pilot code of to-be-requested SI are determined. The to-be-requested SI belongs to second-class SI, the requesting window includes P number of time domain sending opportunities, and each time domain sending opportunity corresponds to one subframe associated with an opportunity for sending a request carrying the pilot code.

In an example, the first-class SI may include information relating to cell selection and cell access.

In an example, the first-class SI may include one scheduling list for recording scheduling information of second-class SI, such as a receiving window length, a scheduling periodicity and a starting subframe of a receiving window for each piece of second-class SI. In an example, the first-class SI may also include requesting window information, such as a requesting window length and a time domain resource offset value A for sending a pilot code, and the requesting window length may be P number of time domain sending opportunities. In an example, the requesting window length may also be P subframes or P uplink Orthogonal Frequency Division Multiplexing (OFDM) symbols, or the like.

In an example, the to-be-requested SI belongs to the second-class SI, and may be, for example, a System Information Block12 (SIB12).

In an example, the first-class SI may also include a pilot code of the second-class SI, and the UE may obtain the pilot code of the second-class SI by analyzing the first-class SI. In another example, the pilot code of the second-class SI may also be preset by a system, and the UE may determine the pilot code of the second-class SI according to the system preset pilot code.

In an example, the pilot code of the second-class SI may be a preamble or may be an orthogonal code of another form, which is not limited herein.

In an example, all of the second-class SI may share one pilot code. In another example, each piece of second-class SI may also correspond to a respective pilot code.

In an example, in the scheduling list, the receiving windows of different SI may be next to each other, e.g., neither overlapping nor gap. An appearance order of each piece of SI in the scheduling list is used to indicate an order of the receiving window of a corresponding SI in the scheduling list.

In an example, the determined receiving window of the to-be-requested SI includes a system frame number and a starting subframe of the receiving window. A method of determining the receiving window of the to-be-requested SI according to the scheduling information in the scheduling list may be referred to the examples shown in FIG. 2A and FIG. 3A, which will be described later.

In an example, a method of determining the requesting window of the to-be-requested SI may be referred to the examples shown in FIG. 2B and FIG. 3B, which will be described later.

At step 102, a first Q number of time domain sending opportunities within the requesting window is monitored to determine whether a request carrying the pilot code is sent from user equipment to the base station, where Q is a natural number less than P.

In an example, according to the requesting window information carried in the first-class SI, such as a requesting window length P and a time domain sending opportunity offset value A for sending a request, UE may determine to send a request carrying the pilot code in one time domain sending opportunity selecting within [1+A, P] time domain sending opportunities. If the UE selects to send the request carrying the pilot code in the (Q+1)-th time domain sending opportunity, the UE may monitor the [1, Q] time domain sending opportunities to determine whether another UE sends a request carrying a pilot code.

In an example, if the first-class SI does not carry the time domain sending opportunity offset value A for sending a pilot code, the UE may randomly and equiprobably select one time domain sending opportunity from the $1^{st}$ to (P−1)-th time domain sending opportunities as the Q-th time domain sending opportunity. In an example, the A may be an offset value configured by the base station according to a UE type, and the value may be different for different UE types.

In another example, the UE may also directly determine the (1+A)-th time domain sending opportunity as the Q-th time domain sending opportunity of the requesting window, where the A is an offset value pre-configured by a system or randomly selected by the UE.

At step 103, when it is monitored that no UE sends a request carrying a pilot code with the first Q number of time domain sending opportunities of the requesting window, the request carrying the pilot code is sent with the (Q+1)-th time domain sending opportunity.

In an example, when the UE monitors a request with the Q-th time domain sending opportunities, a time interval between the Q-th time domain sending opportunity and the (Q+1)-th time domain sending opportunity may be short. Thus, the (Q+1)-th time domain sending opportunity may come out before the UE identifies monitored contents. At this time, the UE may automatically determine that none request carrying the pilot code is monitored with the Q-th time domain sending opportunity, and then send the request carrying the pilot code with the (Q+1)-th time domain sending opportunity.

In an example, if the time interval between the Q-th time domain sending opportunity and the (Q+1)-th time domain sending opportunity is long and the pilot code is a preamble, the UE may identify the monitored contents in time, where the request sending with the Q-th time domain sending opportunity carries the pilot code and the preamble occupies less bits. In this way, the UE may automatically determine whether a request carrying a pilot code is monitored with the Q-th time domain sending opportunity according to the identified contents, and then determine whether to send the request carrying the pilot code with the (Q+1)-th domain sending opportunity.

At step 104, the receiving window of the to-be-requested SI is monitored for the to-be-requested SI sent by the base station In an example, since the UE may not select to send the request with the last time domain sending opportunity of the requesting window, after sending the request, the UE may need to wait for a period of time before the requesting window expires. Therefore, after sending the request, the UE may delay one time interval to monitor whether the base station sends the to-be-requested SI, and a length of the delayed time interval may be determined by the UE according to a time length between a timing of the requesting window expiration and a timing of sending the request.

In an example, the to-be-requested SI may also be sent through a Broadcast Channel (BCH).

In an illustrative scenario, as shown in FIG. 1B, descriptions are made by taking a mobile network as an LTE network and a base station as an evolved Node B (eNB). In the scenario shown in FIG. 1B, eNB 10 and UE 20 are included, where the eNB 10 periodically broadcasts first-class SI, and the UE 20 may determine a requesting window, a receiving window and a pilot code of to-be-requested SI when receiving the first-class SI. The UE 20 may firstly monitor the requesting window to determine whether another UE, such as UE 30, UE 31, . . . , UE 3N, requests the to-be-requested SI. If no other UE sends a request for requesting the to-be-requested SI, the UE 20 may then send a request carrying the pilot code of the to-be-requested SI to the eNB 10.

In this example, based on the above steps 101-104, the UE may be controlled to firstly monitor a corresponding requesting window to determine whether another UE requests the to-be-requested SI. If no other UE sends the request for requesting the to-be-requested SI, the UE may then send the request carrying the pilot code of the to-be-requested SI to the base station. Thus, the request sent by another UE is used for the to-be-requested SI, and the power consumption of the UE is reduced. The performances of sending and receiving SI are greatly improved since the base station does not need to periodically broadcast the second-class SI.

In an example, when the requesting window is located within the receiving window, determining the receiving window of the to-be-requested SI includes:

analyzing a scheduling list of second-class SI from the first-class SI, where the scheduling list is used to record a receiving window length and a receiving window scheduling periodicity of the second-class SI; and determining the receiving window of the to-be-requested SI according to the receiving window length and the receiving window scheduling periodicity recorded in the scheduling list.

In an example, determining the requesting window of the to-be-requested SI includes:

analyzing a requesting window length P of the second-class SI from the first-class SI; and determining P number of time domain sending opportunities within the receiving window which start from a first time domain sending opportunity for sending the request carrying the pilot code as the requesting window of the to-be-requested SI.

In an example, determining the receiving window of the to-be-requested SI according to the receiving window length and the receiving window scheduling periodicity recorded in the scheduling list includes:

calculating a starting frame of the receiving window of the to-be-requested SI according to an appearance order of the to-be-requested SI in the scheduling list, a scheduling periodicity of the to-be-requested SI, a number of subframes included in each frame, and the receiving window length of each piece of second-class SI;

calculating a starting subframe of the receiving window of the to-be-requested SI according to the appearance order of the to-be-requested SI in the scheduling list, the number of subframes included in each frame, and the receiving window length of each piece of second-class SI; and determining consecutive M subframes starting from the starting subframe as the receiving window of the to-be-requested SI, where M refers to the length of the receiving window of the to-be-requested SI.

In an example, when the requesting window is independent from the receiving window of the second-class SI, determining the requesting window of the to-be-requested SI includes:

analyzing a requesting window length and a requesting window scheduling periodicity of the second-class SI from the first-class SI; and determining the requesting window of the second-class SI according to the requesting window length and the requesting window scheduling periodicity of the second-class SI, where the requesting window of the second-class SI is the requesting window of the to-be-requested SI.

In an example, determining the receiving window of the to-be-requested SI includes:

analyzing a scheduling list of second-class SI from the first-class SI, where the scheduling list is used to record a receiving window length and a receiving window scheduling periodicity of the second-class SI;

determining a starting receiving window of the second-class SI according to the receiving window length and the receiving window scheduling periodicity recorded in the scheduling list;

when the starting receiving window of the second-class SI is overlapped with the requesting window of the second-class SI, adjusting the starting receiving window to be located after the requesting window of the second-class SI;

calculating a starting frame of the receiving window of the to-be-requested SI according to the starting receiving window of the second-class SI, an appearance order of the to-be-requested SI in the scheduling list, a scheduling periodicity of the to-be-requested SI, a number of subframes included in each frame, and the receiving window length of each piece of second-class SI;

calculating a starting subframe of the receiving window of the to-be-requested SI according to the appearance order of the to-be-requested SI in the scheduling list, the number of subframes included in each frame, and the receiving window length of each piece of second-class SI; and determining consecutive M subframes starting from the starting subframe as the receiving window of the to-be-requested SI, where M refers to the length of the receiving window of the to-be-requested SI.

In an example, the method of receiving SI may also include:

analyzing a time domain sending opportunity offset value A of the requesting window of the to-be-requested SI from the first-class SI; and randomly selecting one time domain sending opportunity from the (1+A)-th to P-th time domain sending opportunities of the requesting window as the Q-th time domain sending opportunity of the requesting window, and based on the Q-th time domain sending opportunity, executing an operation of monitoring a first Q number of time domain sending opportunities within the requesting window to determine whether the request carrying the pilot code is sent from the user equipment to the base station.

In an example, the method of receiving SI may also include:

determining a (1+A)-th time domain sending opportunity of the requesting window as the Q-th time domain sending opportunity of the requesting window, where the A refers to an offset value preset by a system or randomly selected by user equipment; or randomly selecting one time domain sending opportunity from the first to (P−1)-th time domain sending opportunities of the requesting window as the Q-th time domain sending opportunity of the requesting window, and based on the Q-th time domain sending opportunity, executing an operation of monitoring a first Q number of time domain sending opportunities within the requesting window to determine whether the request carrying the pilot code is sent from the user equipment to the base station.

In an example, the method of receiving SI may also include:

when it is monitored that a request carrying a pilot code is sent from user equipment to the base station with the first Q number of time domain sending opportunities of the requesting window, monitoring the receiving window of the to-be-requested SI for the to-be-requested SI sent by the base station.

In an example, the method of receiving SI may also include:

when an instruction is received within the receiving window of the to-be-requested SI, executing an operation of continuing to monitor the to-be-requested SI in a next receiving window according to the instruction; or requesting the to-be-requested SI from the base station in a unicast manner according to the instruction.

A reference will be made to subsequent examples on how to specifically receive SI.

According to the above methods provided by the examples of the present disclosure, the request sent by another UE is used for the to-be-requested SI, thereby reducing the power consumption. In this way, the performances of sending and receiving SI are greatly improved since the base station does not need to periodically send the second-class SI by broadcast.

The technical solution provided by an example of the present disclosure will be described below based on a specific example.

FIG. 2A is a first flowchart illustrating a method of receiving SI according to another example of the present disclosure. FIG. 2B is a second flowchart illustrating a method of receiving SI according to another example of the present disclosure. According to the above method provided by examples of the present disclosure, in this example, exemplary descriptions will be made by taking determining a receiving window and a requesting window of to-be-requested SI in a case that the requesting window is located within the corresponding receiving window as an example. As shown in FIG. 2A, a flow of determining a receiving window of to-be-requested SI includes the following steps.

At step 201, a starting frame of the receiving window of the to-be-requested SI is calculated according to an appearance order of the to-be-requested SI in a scheduling list, a scheduling periodicity of the to-be-requested SI, a number of subframes included in each frame, and a receiving window length of each piece of second-class SI.

In an example, the appearance order of receiving window of each piece of SI in the scheduling list is used to indicate an order of the receiving window of a corresponding SI in the scheduling list. For example, the appearance order of the first SI in the scheduling list is 1, the appearance order of the second SI is 2, and the appearance order of the n-th SI is n.

In an example, the scheduling periodicities of different SI are independent from each other and do not affect each other. For example, the scheduling periodicity of the SI 1 is 40 ms, and the scheduling periodicity of the SI 2 is 80 ms.

In an example, the number of subframes included in each frame may be 10.

In an example, the receiving window length of each piece of SI may be same, for example, all receiving window lengths are 8 ms. In another example, the receiving window length of each piece of SI may also be different.

In an example, the starting frame of the receiving window of the to-be-requested SI may be calculated based on formula (1):

$$\text{SFN} \bmod T = \text{FLOOR}(x/k) \quad \text{Formula (1)}.$$

In an example, SFN refers to the system frame number of the to-be-requested SI, T refers to the scheduling periodicity of the to-be-requested SI, k refers to the number of subframes included in each frame, the FLOOR function is used to calculate a rounded-down value, and FLOOR(x/k) is used to calculate the largest integer not greater than x/k. For example, if x/k=3.15, FLOOR(x/k)=3.

In an example, when the receiving window length of each piece of SI is same, x may be calculated based on formula (1-1):

$$x = (n-1) \times M \quad \text{Formula (1-1)}.$$

In an example, n is used to indicate the appearance order of the to-be-requested SI in the scheduling list, and M refers to the receiving window length of each piece of SI.

In an example, when the receiving window length of each piece of SI is different, x may be calculated based on formula (1-2):

$$x = M_1 + M_2 + \ldots + M_{n-1} \quad \text{Formula (1-2)}.$$

In an example, n is used to indicate the appearance order of the to-be-requested SI in the scheduling list, and $M_1$, $M_2$, ..., $M_{n-1}$ refer to the respective receiving window length of each piece of SI before the receiving window of the to-be-requested SI.

At step 202, a starting subframe of the receiving window of the to-be-requested SI is calculated according to the appearance order of the to-be-requested SI in the scheduling list, the number of subframes included in each frame, and the receiving window length of each piece of second-class SI.

In an example, the starting subframe of the receiving window of the to-be-requested SI may be calculated based on formula (2):

$$b = x \bmod k + \text{offset} \quad \text{Formula (2)}.$$

In an example, b is used to indicate the subframe number of the starting subframe, x may be calculated based on the formula (1-1) or the formula (1-2), k refers to the number of subframes included in each frame, offset may be analyzed from the first-class SI, or may be a fixed system preset value. For example, the offset may be a value of 0, 1, 2, and so on.

At step 203, consecutive M subframes starting from the starting subframe are determined as the receiving window of the to-be-requested SI.

In an example, M refers to the receiving window length of the to-be-requested SI.

Figure 2B:
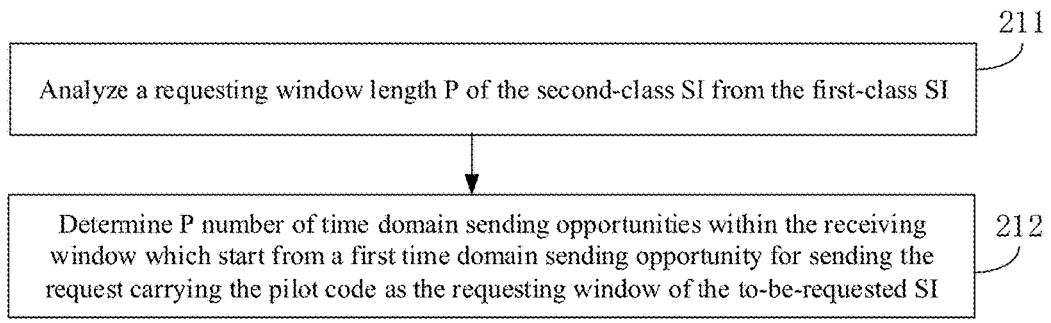
FIG. 2B is a second flowchart illustrating a method of receiving SI according to another example of the present disclosure.

As shown in FIG. 2B, a flow of determining the requesting window of the to-be-requested SI includes the following steps.

At step 211, a requesting window length P of the second-class SI is analyzed from the first-class SI.

At step 212, P number of time domain sending opportunities within the receiving window which start from a first time domain sending opportunity for sending a request carrying a pilot code are determined as the requesting window of the to-be-requested SI.

In an example, if the requesting window length associates with one time-frequency resource, the first time-frequency resource, such as an uplink subframe or an OFDM symbol, after the starting subframe in the receiving window may be determined as the requesting window for sending the request carrying the pilot code.

In an example, if the requesting window length associates with two or more time-frequency resources, P number of time-frequency resources for sending the request carrying the pilot code may be determined as the requesting window.

In this example, the UE may determine the receiving window and the requesting window of the to-be-requested SI when the requesting window is located within the receiving window according to scheduling information in the scheduling list and requesting window information, so that the UE can request the to-be-requested SI within the requesting window and receive the to-be-requested SI within the receiving window.

Figure 3A:
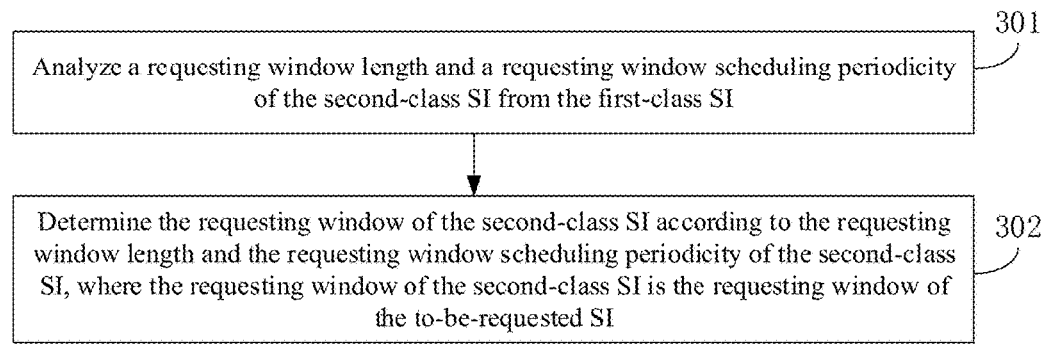
FIG. 3A is a first flowchart illustrating a method of receiving SI according to still another example of the present disclosure.

FIG. 3A is a first flowchart illustrating a method of receiving SI according to still another example of the present disclosure. FIG. 3B is a second flowchart illustrating a method of receiving SI according to still another example of the present disclosure. According to the above method provided by examples of the present disclosure, in this example, exemplary descriptions will be made by taking determining a receiving window and a requesting window of to-be-requested SI in a case that the requesting window is independent from the receiving window as an example. As shown in FIG. 3A, a flow of determining the requesting window of the to-be-requested SI includes the following steps.

At step 301, a requesting window length and a requesting window scheduling periodicity of the second-class SI are analyzed from the first-class SI.

At step 302, the requesting window of the second-class SI is determined according to the requesting window length and the requesting window scheduling periodicity of the second-class SI, where the requesting window of the second-class SI is the requesting window of the to-be-requested SI.

In an example, in the case that the requesting window of the second-class SI is independent from the receiving window, all second-class SI may share one requesting window, and the requesting window is located before all receiving windows in time domain. In one period, if a requesting window exists, the requesting window is located in front of all receiving windows, and each of the receiving windows is arranged next to each other according to the appearance order in the scheduling list.

In an example, when the requesting window is independent from the receiving window, a plurality of pieces of second-class SI may be requested in the requesting window at one time, and each piece of second-class SI may be requested based on a pilot code corresponding to each piece of to-be-requested second-class SI. For example, if SI A and SI B are requested, a pilot code A' of SI A and a pilot code B' of SI B may be carried in the corresponding requests. In another example, one pilot code may also be set for a plurality of pieces of the to-be-requested SI. For example, if the SI A and SIB are requested, a pilot code C' of A and B may be carried in the corresponding requests.

In an example, the starting subframe of the requesting window may be determined based on formula (3):

$$(SFN \times k + b) \bmod T = \text{offset} \qquad \text{Formula (3)}.$$

In an example, SFN refers to a system frame number corresponding to a determined subframe, k refers to the number of subframes included in each frame, b refers to a subframe number of the determined subframe, and offset refers to an offset value assigned in the first-class SI. If the offset value is not assigned, the offset may be set to 0.

In an example, P number of time domain sending opportunities starting from the starting subframe may be determined as the requesting window.

Figure 3B:
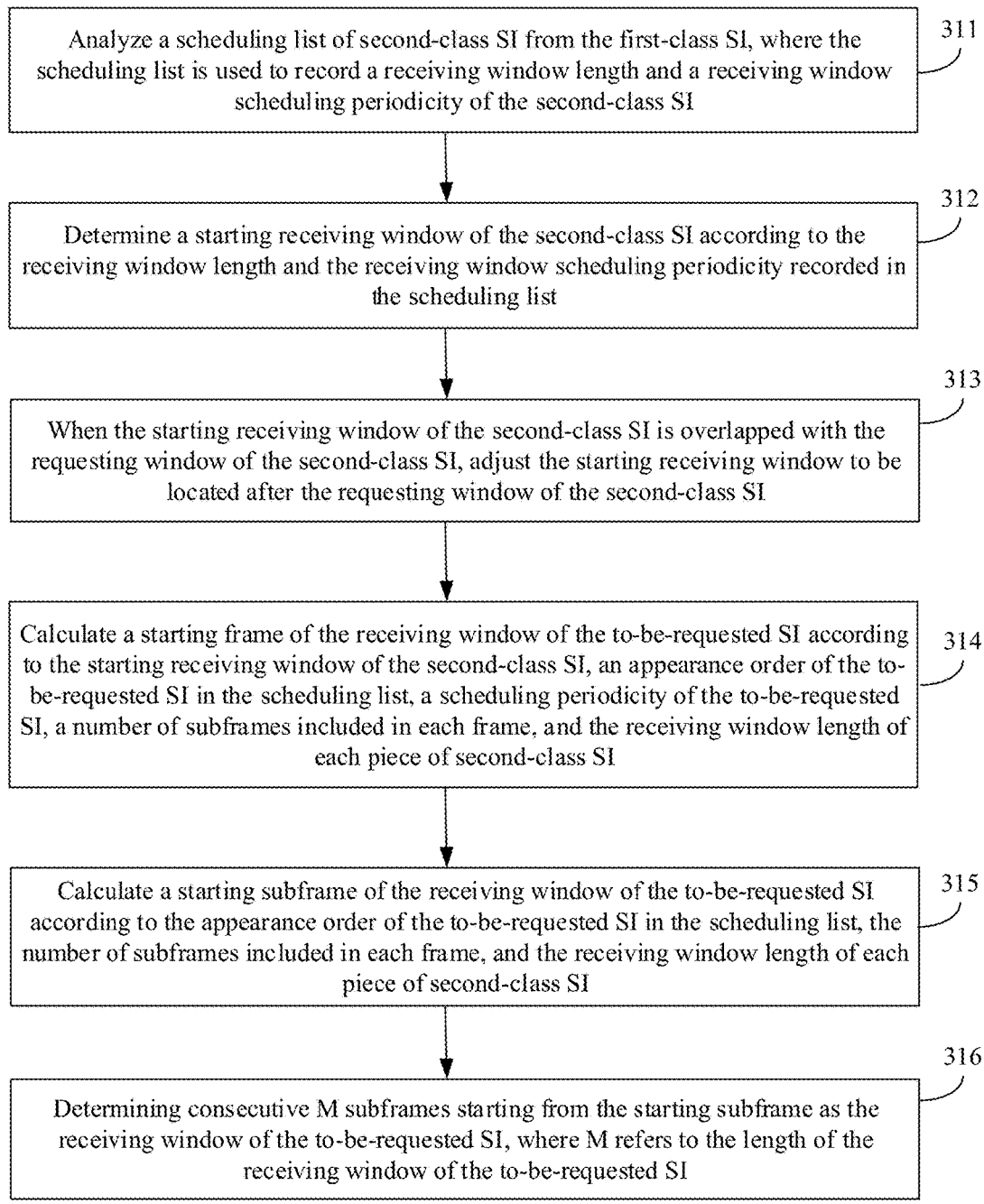
FIG. 3B is a second flowchart illustrating a method of receiving SI according to still another example of the present disclosure.

As shown in FIG. 3B, a flow of determining the receiving window of the to-be-requested SI includes the following steps.

At step 311, a scheduling list of second-class SI is analyzed from the first-class SI, where the scheduling list is used to record a receiving window length and a receiving window scheduling periodicity of the second-class SI.

At step 312, a starting receiving window of the second-class SI is determined according to the receiving window length and the receiving window scheduling periodicity recorded in the scheduling list.

In an example, the starting receiving window may be understood as a receiving window which the appearance order in the scheduling list is the first.

In an example, the starting subframe of the receiving window with the first appearance order may be calculated based on the example shown in FIG. 2A, which will not be described in detail herein.

At step 313, when the starting receiving window of the second-class SI is overlapped with the requesting window of the second-class SI, the starting receiving window is adjusted to be located after the requesting window of the second-class SI.

At step 314, a starting frame of the receiving window of the to-be-requested SI is calculated according to the starting receiving window of the second-class SI, an appearance order of the to-be-requested SI in the scheduling list, a scheduling periodicity of the to-be-requested SI, a number of subframes included in each frame, and the receiving window length of each piece of second-class SI.

At step 315, a starting subframe of the receiving window of the to-be-requested SI is calculated according to the appearance order of the to-be-requested SI in the scheduling list, the number of subframes included in each frame, and the receiving window length of each piece of second-class SI.

At step 316, consecutive M subframes starting from the starting subframe are determined as the receiving window of the to-be-requested SI, where M refers to the receiving window length of the to-be-requested SI.

In an example, the flow of steps 314-315 may be referred to the descriptions of the example shown in FIG. 2A. When an offset value of the starting subframe of the receiving window for the second-class SI is not assigned in the first-class SI, in response to the starting receiving window of the second-class SI overlapping with the requesting window of the second-class SI, the requesting window length may be taken as the offset value for calculating the starting subframe of the receiving window for each piece of second-class SI. When the starting receiving window of the second-class SI is not overlapped with the requesting window of the second-class SI, the offset value for calculating the starting subframe of the receiving window for each piece of second-class SI may be set to 0.

In this example, the UE may determine the receiving window and the requesting window of the to-be-requested SI when the requesting window is independent from the receiving window according to scheduling information in the scheduling list and the requesting window information. The UE may request a plurality of pieces of SI in the requesting window at one time, thereby avoiding a problem of increased power consumption caused by the UE sending the request many times.

Figure 4:
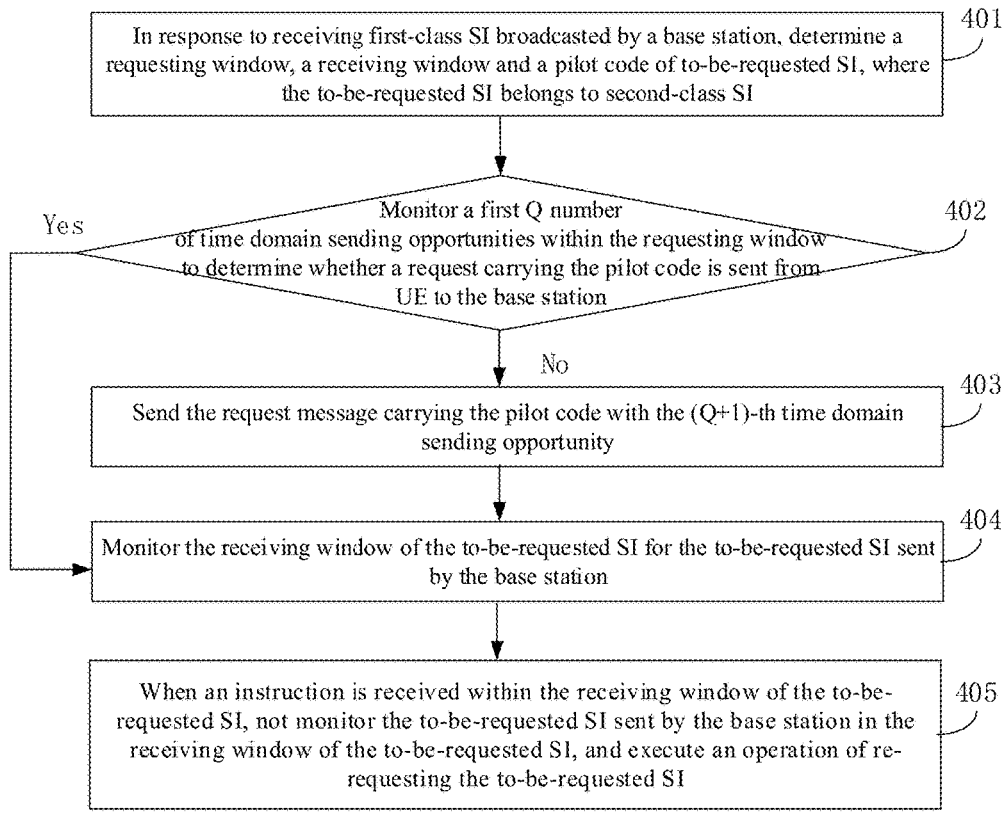
FIG. 4 is a flowchart illustrating a method of receiving SI according to yet another example of the present disclosure.

FIG. 4 is a flowchart illustrating a method of receiving SI according to yet another example of the present disclosure. According to the above method provided by an example of the present disclosure, in this example, exemplary descriptions will be made with UE receiving SI as an example. As shown in FIG. 4, a flow of receiving SI includes the following steps.

At step 401, in response to receiving first-class SI broadcasted by a base station, a requesting window, a receiving window and a pilot code of to-be-requested SI are determined, where the to-be-requested SI belongs to second-class SI.

In an example, the requesting window includes P number of time domain sending opportunities for sending a request carrying a pilot code.

At step 402, a first Q number of time domain sending opportunities within the requesting window is monitored to determine whether a request carrying the pilot code is sent from user equipment to the base station, where Q is a natural number less than P. When it is monitored that a request carrying a pilot code is sent from UE to the base station with the first Q number of time domain sending opportunities of the requesting window, step 404 is performed. When it is monitored that no UE sends a request carrying a pilot code with the first Q number of time domain sending opportunities of the requesting window, step 403 is performed.

At step 403, a request carrying the pilot code is sent with the (Q+1)-th time domain sending opportunity, and step 404 is performed.

At step 404, the receiving window of the to-be-requested SI is monitored for the to-be-requested SI sent by the base station.

In an example, descriptions of steps 401-404 may be referred to the descriptions of steps 101-104 of the example shown in FIG. 1A, which will not be described in detail herein.

At step 405, when an instruction is received within the receiving window of the to-be-requested SI, the to-be-requested SI sent by the base station is not monitored in the receiving window of the to-be-requested SI, and an operation of re-requesting the to-be-requested SI is executed.

In an example, the instruction is used to instruct that the base station does not send the to-be-requested SI within the receiving window. In another example, the instruction is also used to instruct that the base station may send the to-be-requested SI within the next receiving window. In still another example, the instruction is also used for the base station to instruct the UE to request the to-be-requested SI in a unicast manner.

In an example, if the instruction instructs that the base station may send the to-be-requested SI within the next receiving window, the monitoring of the to-be-requested SI may be continued within the next receiving window of the to-be-requested SI. In another example, if the instruction instructs that UE requests the to-be-requested SI in a unicast manner, the to-be-requested SI may be requested from the base station in a unicast manner.

In an example, the method of requesting the to-be-requested SI in the unicast manner may include: sending a request carrying a pilot code through MSG3 signaling in a random access process; or sending a request carrying a pilot code to the base station after accessing the base station; or sending, by the base station, the to-be-requested SI to the UE through MSG2 signaling in the random access process. In an example, a pilot code requesting the to-be-requested SI in the unicast manner may be different from a pilot code of a broadcast request.

In an example, even if the instruction does not instruct the UE to request the to-be-requested SI from the base station in a unicast manner, the UE may also automatically switch to the unicast requesting manner when the to-be-requested SI is not received.

In this example, the UE may execute an operation of requesting the to-be-requested SI in the unicast manner according to the instruction sent by the base station within the receiving window of the to-be-requested SI. Therefore, when the base station does not broadcast the to-be-requested SI, the to-be-requested SI may be obtained in time in the unicast manner, thereby improving the performances of sending and receiving SI.

Figure 5:
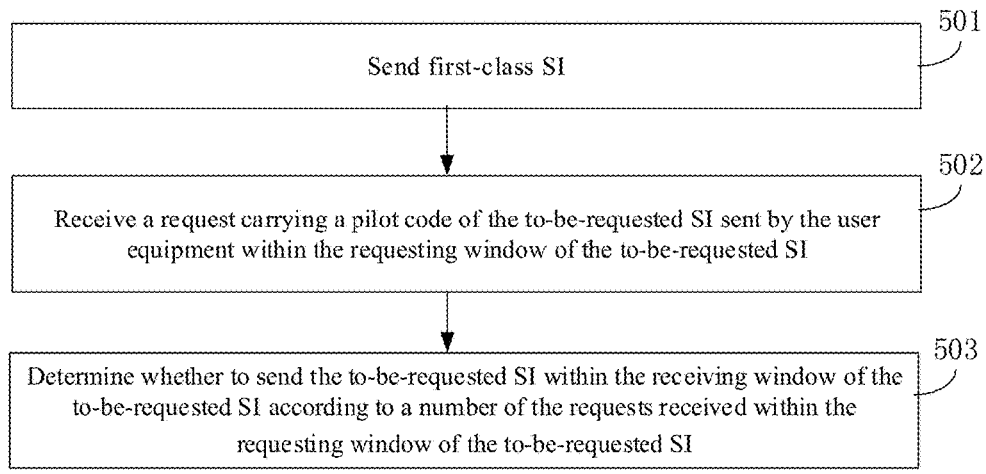
FIG. 5 is a flowchart illustrating a method of sending SI according to an example of the present disclosure.

FIG. 5 is a flowchart illustrating a method of sending SI according to an example of the present disclosure. The method of sending SI may be applied to an eNB, and descriptions will be made to this example in combination with FIG. 1B. As shown in FIG. 5, the method of sending SI includes the following steps 501-503.

At step 501, first-class SI is sent.

In an example, the first-class SI may include information relating to cell selection and cell access. In another example, in addition to implementing its own functions, such as a UE random access function, the first-class SI may also include scheduling information and requesting window information of second-class SI. The scheduling information is used to determine a receiving window of to-be-requested SI which is applied by UE. The requesting window information is used to determine a requesting window of to-be-requested SI which is applied by UE. The to-be-requested SI belongs to the second-class SI.

In an example, if the scheduling information includes a pilot code of the second-class SI, the scheduling information may also be used to determine the pilot code of the to-be-requested SI which is applied by UE.

At step 502, a request that carries a pilot code of to-be-requested SI is received, where the request is sent by the UE within a requesting window of the to-be-requested SI.

At step 503, whether to send the to-be-requested SI within a receiving window of the to-be-requested SI is determined according to a number of requests received within the requesting window of the to-be-requested SI.

In an example, when the number is less than a preset number threshold, sending the to-be-requested SI within the receiving window of the to-be-requested SI is rejected. When the number is not less than the preset number threshold, the to-be-requested SI is sent within the receiving window of the to-be-requested SI.

In an example, by setting the preset number threshold, the operation of broadcasting the to-be-requested SI will not be executed when the number of UE requesting the to-be-requested SI is small, thereby avoiding the resource waste problem caused by broadcasting the SI. When the number of UE requesting the to-be-requested SI is large, the operation of broadcasting the to-be-requested SI may also be executed to reduce the power consumption of the UE.

In an example, when determining that the to-be-requested SI is not broadcasted, the base station may send an instruction on a physical downlink control channel.

In an example, the instruction is used to instruct that the base station does not send the to-be-requested SI within the receiving window. In another example, the instruction is also used to instruct that the base station may send the to-be-requested SI within the next receiving window. In still another example, the instruction is also used for the base station to instruct the UE to request the to-be-requested SI in a unicast manner.

In an example, when determining to send the to-be-requested SI, the base station may send corresponding to-be-requested SI N times in a downlink subframe within a receiving window, where N is a natural number not less than 1.

In an example, the base station may send the to-be-requested SI corresponding to a preamble on a physical downlink shared channel within the receiving window according to an SI scheduling instruction, so that all UE may receive the SI.

In an example, if the UE requests a plurality of pieces of second-class SI by sending request s, the base station may send corresponding second-class SI in the receiving window of each piece of requested second-class SI.

In an illustrative scenario, as shown in FIG. 1B, descriptions are made by taking a mobile network as an LTE network and a base station as an evolved Node B (eNB). The scenario shown in FIG. 1B includes eNB 10 and UE 20, where the eNB 10 periodically broadcasts the first-class SI, and the UE 20 may determine a receiving window and a requesting window of the to-be-requested SI when receiving the first-class SI. When receiving a request from the UE, the eNB 10 may determine whether to broadcasting the to-be-requested SI according to the number of UE requesting the to-be-requested SI.

In this example, based on the above steps 501-503, first-class SI is sent by a base station. Then, the base station may receive a request that carries a pilot code of to-be-requested SI, where the request is sent by UE within a requesting window of the to-be-requested SI. Whether to send the to-be-requested SI within a receiving window of the to-be-requested SI is determined by the base station according to a number of requests received within the requesting window of the to-be-requested SI. The performances of sending and receiving SI are greatly improved since the base station does not need to periodically broadcast the second-class SI.

In an example, determining whether to send the to-be-requested SI within the receiving window of the to-be-requested SI according to the number of the requests received within the requesting window of the to-be-requested SI includes:

determining whether the number is less than a preset number threshold;

when the number is less than the preset number threshold, rejecting sending the to-be-requested SI within the receiving window of the to-be-requested SI; and when the number is not less than the preset number threshold, sending the to-be-requested SI within the receiving window of the to-be-requested SI.

In an example, the method of sending SI further includes:

when the number is less than the preset number threshold, sending an instruction on a physical downlink control channel.

In an example, sending the to-be-requested SI within the receiving window of the to-be-requested SI includes:

sending the to-be-requested SI N times within the receiving window of the to-be-requested SI, where N indicates a natural number not less than 1.

In an example, the method of sending SI further includes:

setting the scheduling information and the requesting window information for each piece of SI in the second-class SI, where the scheduling information includes a receiving window length and a scheduling periodicity;

adding the scheduling information of second-class SI to a scheduling list in an order, where the order is used for the user equipment to calculate a receiving window of the corresponding SI; and generating the first-class SI according to the scheduling list and the requesting window information.

A reference will be made to subsequent examples on how to specifically generate the first-class SI.

The technical solution provided by an example of the present disclosure will be described below based on a specific example.

Figure 6:
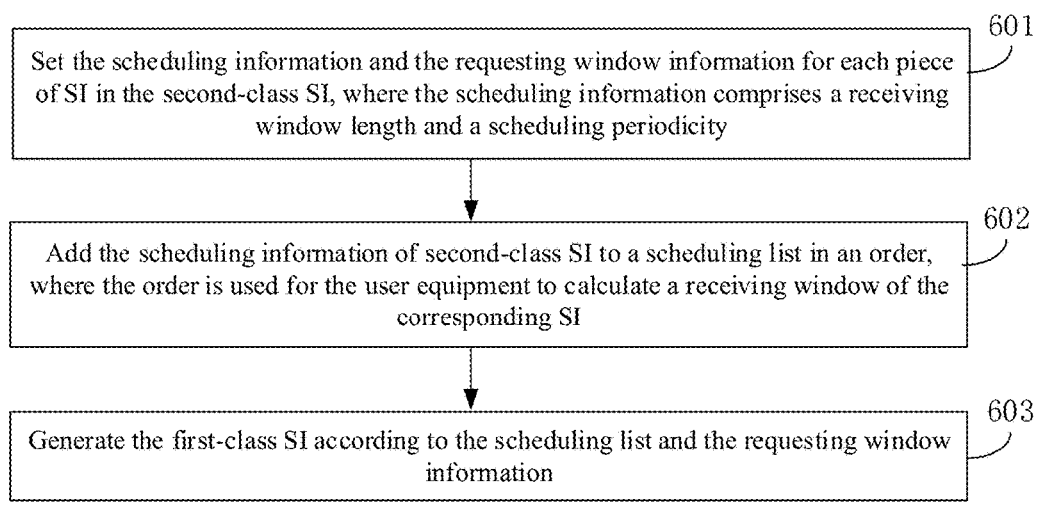
FIG. 6 is a flowchart illustrating a method of sending SI according to another example of the present disclosure.

FIG. 6 is a flowchart illustrating a method of sending SI according to another example of the present disclosure. According to the above method provided by examples of the present disclosure, in this example, exemplary descriptions will be made by taking how to generate first-class SI as an example. As shown in FIG. 6, the method includes the following steps.

At step 601, scheduling information and requesting window information are set for each piece of SI in second-class SI, where the scheduling information includes a receiving window length and a scheduling periodicity.

In an example, the scheduling information may also include scheduling information such as an offset of a starting subframe for each receiving window and a time-frequency resource used by UE for sending a preamble.

In an example, the scheduling periodicities of different SI are independent from each other. In another example, the length of each receiving window may be same or different.

In an example, the requesting window information includes a requesting window length and a requesting window scheduling periodicity.

At step 602, the scheduling information of second-class SI is added to a scheduling list in an order, where the order is used for the UE to calculate the receiving window of corresponding SI.

At step 603, first-class SI is generated according to the scheduling list and the requesting window information.

In an illustrative scenario, as shown in FIG. 1B, the eNB 10 may add scheduling information and requesting window information of each piece of second-class SI to the first-class SI after determining the scheduling information and the requesting window information of the second-class SI. When the base station broadcasts the first-class SI, the UE 20 may determine the receiving window of each piece of second-class SI according to the scheduling information of second-class SI and determine the requesting window of the second-class SI according to the requesting window information, so that the UE 20 may request the to-be-requested SI and receive the to-be-requested SI sent by eNB 10 within the receiving window.

In this example, the base station may add the scheduling information of second-class SI to the first-class SI. The UE is controlled to firstly monitor whether another UE requests the to-be-requested SI within a corresponding requesting window. If no other UE sends the request requesting the to-be-requested SI, the UE may then send the request carrying the pilot code of the to-be-requested SI to the base station. Thus, the request sent by another UE is used for the to-be-requested SI, and the power consumption of the UE is reduced. The performances of sending and receiving the SI are greatly improved since the base station does not need to periodically broadcast the second-class SI.

Figure 7:
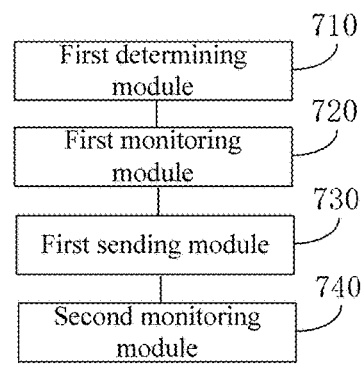
FIG. 7 is a block diagram illustrating an apparatus for receiving SI according to an example of the present disclosure.

FIG. 7 is a block diagram illustrating an apparatus for receiving SI according to an example of the present disclosure. As shown in FIG. 7, the apparatus for receiving SI includes:

a first determining module 710, configured to determine a requesting window, a receiving window and a pilot code of to-be-requested SI in response to receiving first-class SI broadcasted by a base station, where the to-be-requested SI belongs to second-class SI, the requesting window includes P number of time domain sending opportunities, and each time domain sending opportunity corresponds to one subframe associated with an opportunity for sending a request carrying the pilot code;

a first monitoring module 720, configured to monitor a first Q number of time domain sending opportunities within the requesting window to determine whether a request carrying the pilot code is sent from user equipment to the base station, where Q indicates a natural number less than P, and the requesting window is determined by the first determining module 710;

a first sending module 730, configured to send the request carrying the pilot code with the (Q+1)-th time domain sending opportunity when the first monitoring module 720 monitors that no user equipment sends the request carrying the pilot code to the base station with the first Q number of time domain sending opportunities of the requesting window; and a second monitoring module 740, configured to monitor the receiving window of the to-be-requested SI for the to-be-requested SI sent by the base station.

Figure 8:
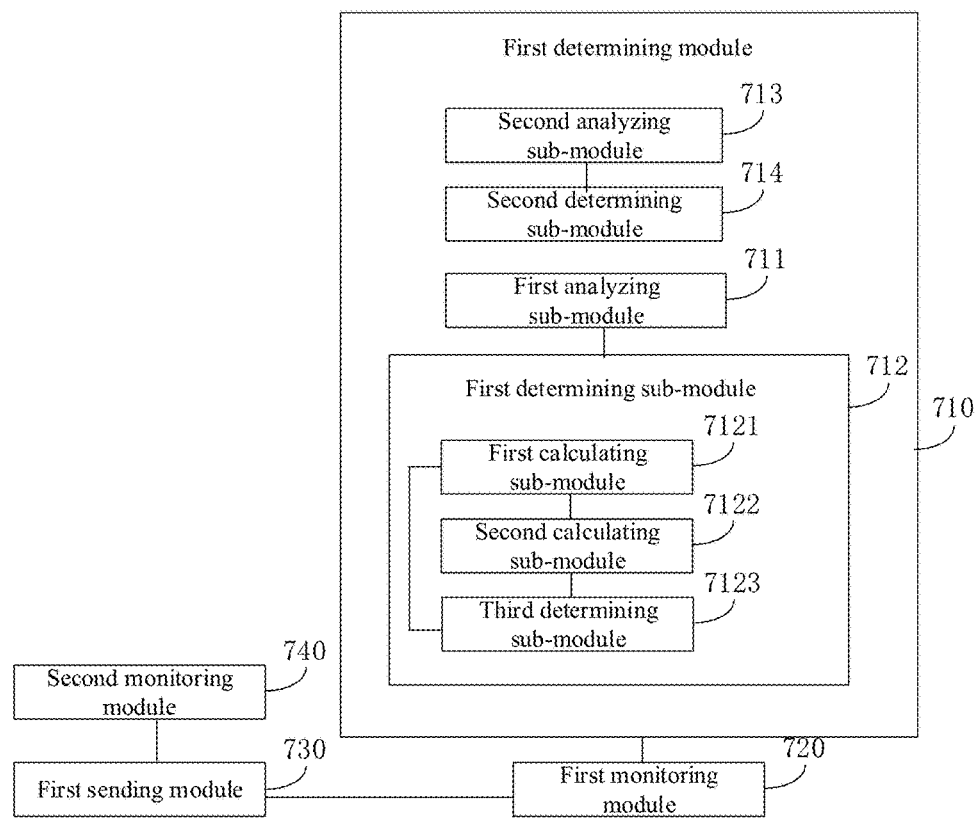
FIG. 8 is a block diagram illustrating an apparatus for receiving SI according to another example of the present disclosure.

FIG. 8 is a block diagram illustrating an apparatus for receiving SI according to another example of the present disclosure. As shown in FIG. 8, in an example, on the basis of the above example shown in FIG. 7, when the requesting window is located within the receiving window, the first determining module 710 includes:

a first analyzing sub-module 711, configured to analyze a scheduling list of second-class SI from the first-class SI, where the scheduling list is used to record a receiving window length and a receiving window scheduling periodicity of the second-class SI; and a first determining sub-module 712, configured to determine the receiving window of the to-be-requested SI according to the receiving window length and the receiving window scheduling periodicity recorded in the scheduling list, where the scheduling list is analyzed by the first analyzing sub-module 711.

In an example, the first determining module 710 includes:

a second analyzing sub-module 713, configured to analyze a requesting window length P of the second-class SI from the first-class SI; and a second determining sub-module 714, configured to determine P number of time domain sending opportunities within the receiving window which start from a first time domain sending opportunity for sending the request carrying the pilot code as the requesting window of the to-be-requested SI.

In an example, the first determining sub-module 712 includes:

a first calculating sub-module 7121, configured to calculate a starting frame of the receiving window of the to-be-requested SI according to an appearance order of the to-be-requested SI in the scheduling list, a scheduling periodicity of the to-be-requested SI, a number of subframes included in each frame, and the receiving window length of each piece of second-class SI;

a second calculating sub-module 7122, configured to calculate a starting subframe of the receiving window of the to-be-requested SI according to the appearance order of the to-be-requested SI in the scheduling list, the number of subframes included in each frame, and the receiving window length of each piece of second-class SI; and a third determining sub-module 7123, configured to determine consecutive M subframes starting from the starting subframe as the receiving window of the to-be-requested SI, where M refers to the length of the receiving window of the to-be-requested SI, where the starting subframe is calculated by the second calculating sub-module 7122.

Figure 9:
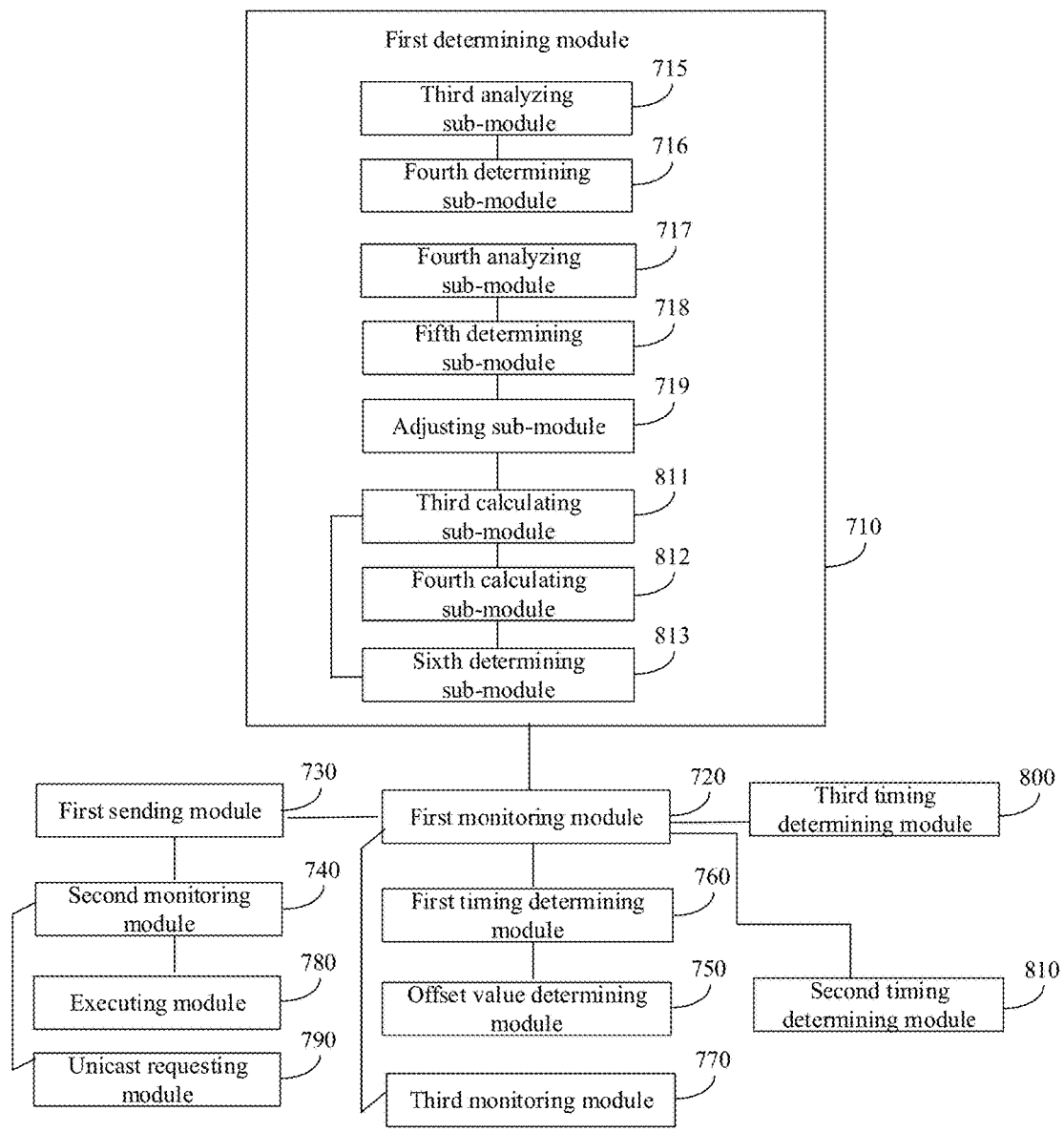
FIG. 9 is a block diagram illustrating an apparatus for receiving SI according to still another example of the present disclosure.

FIG. 9 is a block diagram illustrating an apparatus for receiving SI according to still another example of the present disclosure. As shown in FIG. 9, in an example, on the basis of the above example(s) shown in FIG. 7 and/or FIG. 8, when the requesting window is independent from the receiving window of the second-class SI, the first determining module 710 include:

a third analyzing sub-module 715, configured to analyze a requesting window length and a requesting window scheduling periodicity of the second-class SI from the first-class SI; and a fourth determining sub-module 716, configured to determine the requesting window of the second-class SI according to the requesting window length and the requesting window scheduling periodicity of the second-class SI, where the requesting window of the second-class SI is the requesting window of the to-be-requested SI, where the requesting window length and the requesting window scheduling periodicity of the second-class SI are analyzed by the third analyzing sub-module 715.

In an example, the first determining module 710 includes:

a fourth analyzing sub-module 717, configured to analyze a scheduling list of second-class SI from the first-class SI, where the scheduling list is used to record a receiving window length and a receiving window scheduling periodicity of the second-class SI;

a fifth determining sub-module 718, configured to determine a starting receiving window of the second-class SI according to the receiving window length and the receiving window scheduling periodicity recorded in the scheduling list;

an adjusting sub-module 719, configured to adjust the starting receiving window to be located after the requesting window of the second-class SI when the starting receiving window of the second-class SI is overlapped with the requesting window of the second-class SI, where the starting receiving window is determined by the fifth determining sub-module 718;

a third calculating sub-module 811, configured to calculate a starting frame of the receiving window of the to-be-requested SI according to the starting receiving window of the second-class SI, an appearance order of the to-be-requested SI in the scheduling list, a scheduling periodicity of the to-be-requested SI, a number of subframes included in each frame, and the receiving window length of each piece of second-class SI;

a fourth calculating sub-module 812, configured to calculate a starting subframe of the receiving window of the to-be-requested SI according to the appearance order of the to-be-requested SI in the scheduling list, the number of subframes included in each frame, and the receiving window length of each piece of second-class SI; and a sixth determining sub-module 813, configured to determine consecutive M subframes starting from the starting subframe as the receiving window of the to-be-requested SI, where M refers to the length of the receiving window of the to-be-requested SI.

In an example, the apparatus also includes:

an offset value determining module 750, configured to analyze a time domain sending opportunity offset value a of the requesting window of the to-be-requested SI from the first-class SI; and a first timing determining module 760, configured to randomly select one time domain sending opportunity from the (1+A)-th to P-th time domain sending opportunities of the requesting window as the Q-th time domain sending opportunity of the requesting window, and based on the Q-th time domain sending opportunity, the first monitoring module 720 executes an operation of monitoring a first Q number of time domain sending opportunities within the requesting window to determine whether the request carrying the pilot code is sent from the user equipment to the base station.

In an example, the apparatus also includes:

a second timing determining module 810, configured to determine a (1+A)-th time domain sending opportunity of the requesting window as the Q-th time domain sending opportunity of the requesting window, where the A refers to an offset value preset by a system or randomly selected by user equipment; or a third timing determining module 800, configured to randomly select one time domain sending opportunity from the first to (P−1)-th time domain sending opportunities of the requesting window as the Q-th time domain sending opportunity of the requesting window, and based on the Q-th time domain sending opportunity, the first monitoring module 720 executes an operation of monitoring a first Q number of time domain sending opportunities within the requesting window to determine whether the request carrying the pilot code is sent from the user equipment to the base station.

In an example, the apparatus also includes:

a third monitoring module 770, configured to monitor the receiving window of the to-be-requested SI for the to-be-requested SI sent by the base station when the first monitoring module 720 monitors that a request carrying a pilot code is sent from user equipment to the base station in the first Q number of time domain sending opportunities of the requesting window.

In an example, the apparatus also includes:

an executing module 780, configured to executing an operation of continuing to monitor the to-be-requested SI in a next receiving window according to an instruction when the instruction is received by the second monitoring module 740 within the receiving window of the to-be-requested SI; or a unicast requesting module 790, configured to request the to-be-requested SI from the base station in a unicast manner according to an instruction when the instruction is received by the second monitoring module 740 within the receiving window of the to-be-requested SI.

Figure 10:
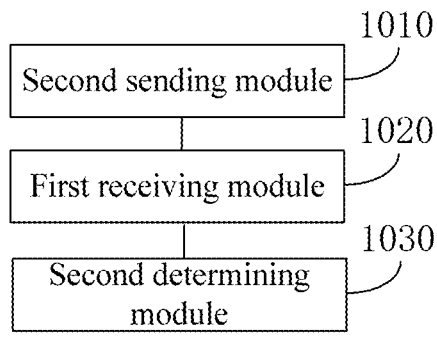
FIG. 10 is a block diagram illustrating an apparatus for sending SI according to an example of the present disclosure.

FIG. 10 is a block diagram illustrating an apparatus for sending SI according to an example of the present disclosure. As shown in FIG. 10, the apparatus for sending SI includes:

a second sending module 1010, configured to send first-class SI, where the first-class SI carries scheduling information and requesting window information of second-class SI, the scheduling information is used to determine a receiving window of to-be-requested SI which is applied by user equipment, the requesting window information is used to determine a requesting window of the to-be-requested SI which is applied by the user equipment, and the to-be-requested SI belongs to the second-class SI;

a first receiving module 1020, configured to receive a request carrying a pilot code of the to-be-requested SI sent by the user equipment within the requesting window of the to-be-requested SI; and a second determining module 1030, configured to determine whether to send the to-be-requested SI within the receiving window of the to-be-requested SI according to a number of the requests received within the requesting window of the to-be-requested SI.

Figure 11:
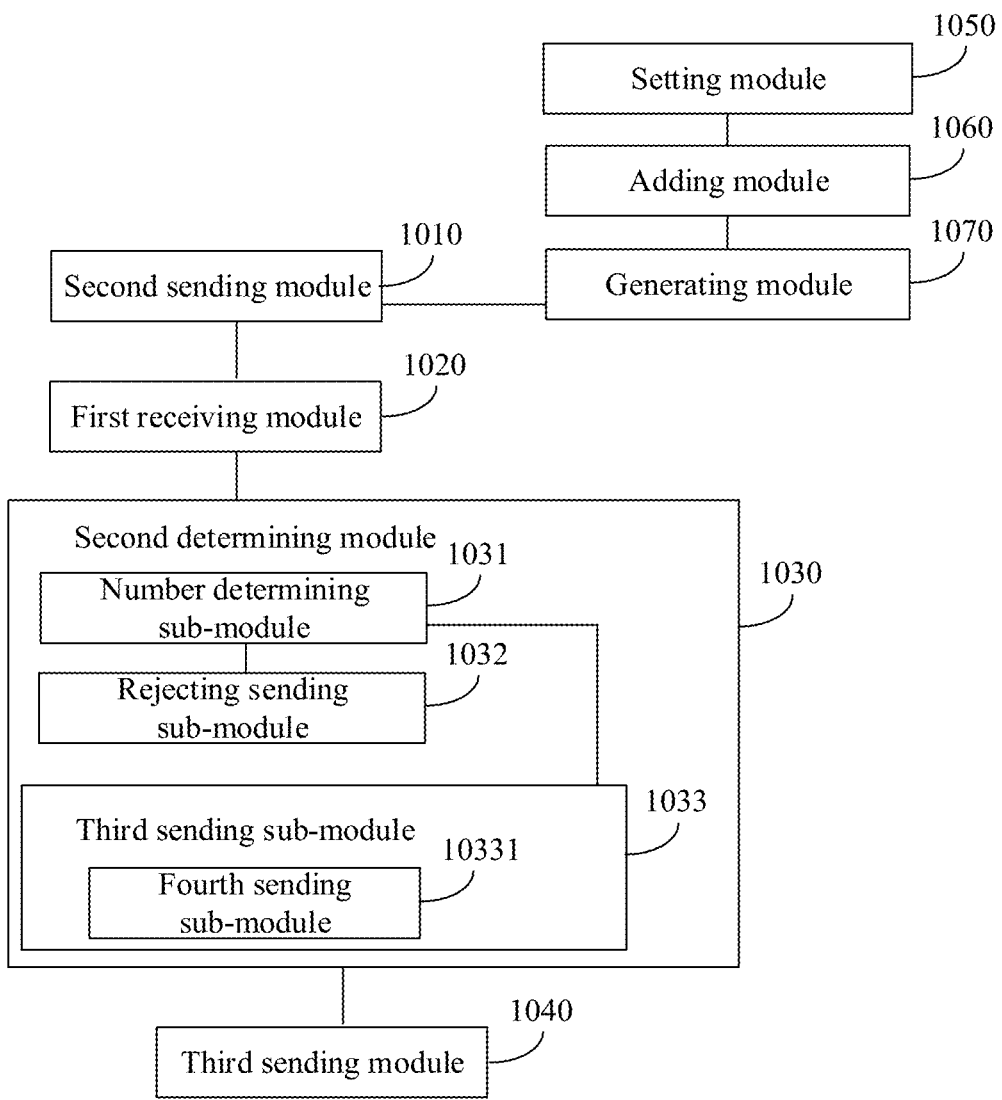
FIG. 11 is a block diagram illustrating an apparatus for sending SI according to another example of the present disclosure.

FIG. 11 is a block diagram illustrating an apparatus for sending SI according to another example of the present disclosure. As shown in FIG. 11, in an example, on the basis of the above example shown in FIG. 10, the second determining module 1030 includes:

a number determining sub-module 1031, configured to determine whether the number is less than a preset number threshold;

a sending rejecting sub-module 1032, configured to reject sending the to-be-requested SI within the receiving window of the to-be-requested SI when the number determining sub-module 1031 determines that the number is less than the preset number threshold; and a third sending sub-module 1033, configured to send the to-be-requested SI within the receiving window of the to-be-requested SI when the number determining sub-module 1031 determines that the number is not less than the preset number threshold.

In an example, the apparatus also includes:

a third sending module 1040, configured to send an instruction on a physical downlink control channel when the number determining sub-module 1031 determines that the number is less than the preset number threshold.

In an example, the third sending sub-module 1033 includes:

a fourth sending sub-module 10331, configured to send the to-be-requested SI N times within the receiving window of the to-be-requested SI, where N indicates a natural number not less than 1.

In an example, the apparatus also includes:

a setting module 1050, configured to set the scheduling information and the requesting window information for each piece of SI in the second-class SI, where the scheduling information includes a receiving window length and a scheduling periodicity;

an adding module 1060, configured to add the scheduling information of second-class SI to a scheduling list in an order, where the order is used for the user equipment to calculate a receiving window of the corresponding SI, the scheduling information is set by the setting module 1050; and a generating module 1070, configured to generate the first-class SI according to the scheduling list and the requesting window information.

For the above apparatuses in the examples, a specific manner in which each module executes an operation is already described in detail in the related method examples and will not be described in detail herein.

Figure 12:
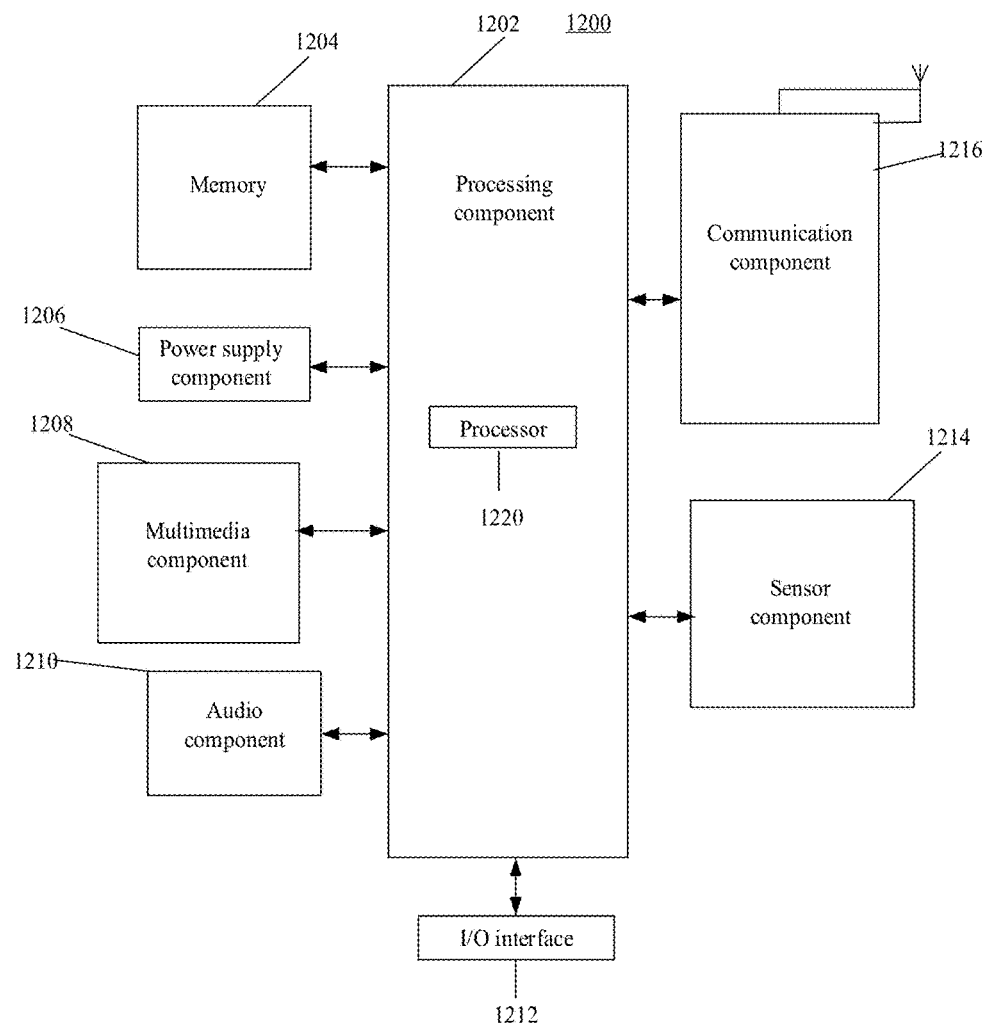
FIG. 12 is a block diagram illustrating an apparatus applicable to receiving SI according to an example of the present disclosure.

FIG. 12 is a block diagram illustrating an apparatus applicable to receiving SI according to an example of the present disclosure. For example, an apparatus 1200 may be UE, such as a mobile phone, a computer, a digital broadcast terminal, a message transceiver, a game console, a tablet device, a medical device, a fitness device, and a personal digital assistant.

As shown in FIG. 12, the apparatus 1200 may include one or more of the following components: a processing component 1202, a memory 1204, a power supply component 1206, a multimedia component 1208, an audio component 1210, an input/output (I/O) interface 1212, a sensor component 1214, and a communication component 1216.

The processing component 1202 generally controls overall operations of the apparatus 1200, such as operations associated with display, phone calls, data communications, camera operations, and recording operations. The processing component 1202 may include one or more processors 1220 for executing instructions to complete all or a part of steps of the above method. In addition, the processing component 1202 may include one or more modules which facilitate the interaction between the processing component 1202 and other components. For example, the processing component 1202 may include a multimedia module to facilitate the interaction between the multimedia component 1208 and the processing component 1202.

The memory 1204 may be configured to store various types of data to support the operation of the apparatus 1200. Examples of such data include instructions for any application or method operated on the apparatus 1200, contact data, phonebook data, messages, pictures, videos, and so on. The memory 1204 may be implemented by any type of volatile or non-volatile memory devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic, or compact disk.

The power supply component 1206 may provide power to different components of the apparatus 1200. The power supply component 1206 may include a power management system, one or more power supplies and other components associated with generating, managing, and distributing power for the apparatus 1200.

The multimedia component 1208 may include a screen providing an output interface between the apparatus 1200 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some examples, the multimedia component 1208 may include a front camera and/or a rear camera. The front camera and/or rear camera may receive external multimedia data when the apparatus 1200 is in an operating mode, such as a photographing mode or a video mode. Each of the front camera and the rear camera may be a fixed optical lens system or have focal length and optical zooming capability.

The audio component 1210 may be configured to output and/or input an audio signal. For example, the audio component 1210 may include a microphone (MIC) configured to receive an external audio signal when the apparatus 1200 is in an operating mode, such as a call mode, a recording mode, and a voice recognition mode. The received audio signal may be further stored in the memory 1204 or sent via the communication component 1216. In some examples, the audio component 1210 further includes a speaker to output an audio signal.

The I/O interface 1212 provides an interface between the processing component 1202 and peripheral interface modules. The above peripheral interface modules may be a keyboard, a click wheel, buttons, and so on. These buttons may include, but are not limited to, a home button, a volume button, a starting button, and a locking button.

The sensor component 1214 may include one or more sensors to provide status assessments of various aspects for the apparatus 1200. For example, the sensor component 1214 may detect an on/off state of the apparatus 1200, and relative positioning of component, for example, the component is a display and a mini-keypad of the apparatus 1200. The sensor component 1214 may also detect a change in position of the apparatus 1200 or a component of the apparatus 1200, a presence or absence of the contact between a user and the apparatus 1200, an orientation or an acceleration/deceleration of the apparatus 1200, and a change in temperature of the apparatus 1200. The sensor component 1214 may include a proximity sensor configured to detect the presence of a nearby object without any physical contact. The sensor component 1214 may further include an optical sensor, such as a CMOS or CCD image sensor which is used in imaging applications. In some examples, the sensor component 1214 may further include an acceleration sensor, a gyroscope sensor, a magnetic sensor, a pressure sensor, or a temperature sensor.

The communication component 1216 may be configured to facilitate wired or wireless communication between the apparatus 1200 and other devices. The apparatus 1200 may access a wireless network that is based on a communication standard, such as Wi-Fi, 2G, 3G or a combination thereof. In an example, the communication component 1216 receives broadcast signals or broadcast-associated information from an external broadcast management system via a broadcast channel. In an example, the communication component 1216 further includes a Near Field Communication (NFC) module to facilitate short-range communications. For example, the NFC module may be implemented based on a Radio Frequency Identification (RFID) technology, an Infrared Data Association (IrDA) technology, an Ultra Wideband (UWB) technology, a Bluetooth® (BT) technology and other technologies.

In an example, the apparatus 1800 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronic components for performing the above method.

In an example, there is also provided a non-transitory machine-readable storage medium including instructions, such as a memory 1204 including instructions. The above instructions may be executed by the processor 1220 of the apparatus 1200 to perform the above method. For example, the non-transitory machine-readable storage medium may be a ROM, a RAM, a CD-ROM, a magnetic tape, a floppy disk, and an optical data storage device and so on.

The processor 1220 is configured to:

in response to receiving first-class SI broadcasted by a base station, determine a requesting window, a receiving window and a pilot code of to-be-requested SI, where the to-be-requested SI belongs to second-class SI, the requesting window includes P number of time domain sending opportunities, and each time domain sending opportunity corresponds to one subframe associated with an opportunity for sending a request carrying the pilot code;

monitor a first Q number of time domain sending opportunities within the requesting window to determine whether a request carrying the pilot code is sent from user equipment to the base station, where Q indicates a natural number less than P;

when it is monitored that no user equipment sends the request carrying the pilot code to the base station with the first Q number of time domain sending opportunities of the requesting window, send the request carrying the pilot code with the (Q+1)-th time domain sending opportunity; and monitor the receiving window of the to-be-requested SI for the to-be-requested SI sent by the base station.

Figure 13:
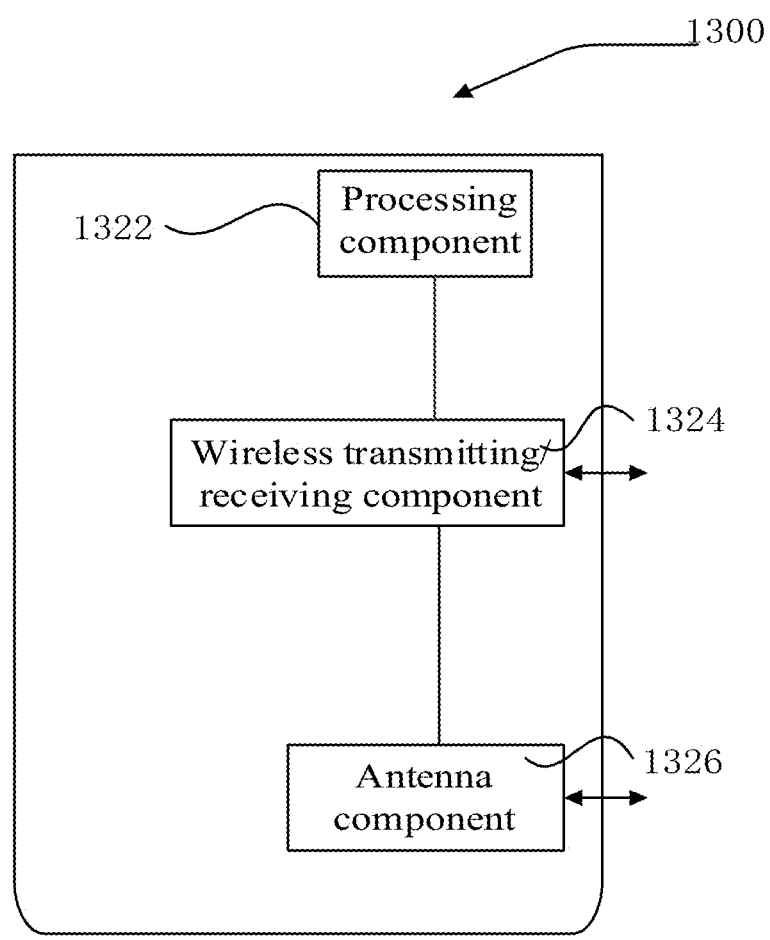
FIG. 13 is a block diagram illustrating an apparatus applicable to sending SI according to an example of the present disclosure.

FIG. 13 is a block diagram illustrating an apparatus applicable to sending SI according to an example of the present disclosure. The apparatus 1300 may be provided as a base station. As shown in FIG. 13, the apparatus 1300 includes a processing component 1322, a wireless transmitting/receiving component 1324, an antenna component 1326, and a signal processing part unique to a wireless interface. The processing component 1322 may further include one or more processors.

One of the processors in the processing component 1322 may be configured to:

send first-class SI, where the first-class SI carries scheduling information and requesting window information of second-class SI, the scheduling information is used to determine a receiving window of to-be-requested SI which is applied by user equipment, the requesting window information is used to determine a requesting window of the to-be-requested SI which is applied by the user equipment, and the to-be-requested SI belongs to the second-class SI;

receive a request carrying a pilot code of the to-be-requested SI sent by the user equipment within the requesting window of the to-be-requested SI; and determine whether to send the to-be-requested SI within the receiving window of the to-be-requested SI according to a number of the requests received within the requesting window of the to-be-requested SI.

Other implementations of the present disclosure will be apparent to those skilled in the art from consideration of the specification and practice of the present disclosure herein. The present disclosure is intended to cover any variations, usages, or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

What is claimed is:

1. A method of receiving system information (SI), comprising:

in response to receiving first-class SI broadcasted by a base station, determining a requesting window, a receiving window, and a pilot code of to-be-requested SI, wherein the to-be-requested SI belongs to second-class SI, the requesting window comprises P number of time domain sending opportunities, and each time domain sending opportunity corresponds to one subframe associated with an opportunity for sending a request carrying the pilot code;

monitoring a first Q number of time domain sending opportunities within the requesting window to determine whether a request carrying the pilot code is sent from user equipment to the base station, wherein P is an integer greater than 1 and Q indicates a natural number less than P;

when it is monitored that no user equipment sends the request carrying the pilot code to the base station with the first Q number of time domain sending opportunities of the requesting window, sending the request carrying the pilot code at the (Q+1)-th time domain sending opportunity; and monitoring the receiving window of the to-be-requested SI for the to-be-requested SI sent by the base station.

2. The method of claim 1, wherein when the requesting window is located within the receiving window, determining the receiving window of the to-be-requested SI comprises:

analyzing a scheduling list of second-class SI from the first-class SI, wherein the scheduling list records a receiving window length and a receiving window scheduling periodicity of the second-class SI; and determining the receiving window of the to-be-requested SI according to the receiving window length and the receiving window scheduling periodicity recorded in the scheduling list.

3. The method of claim 2, wherein determining the requesting window of the to-be-requested SI comprises:

analyzing a requesting window length P of the second-class SI from the first-class SI; and determining P number of time domain sending opportunities within the receiving window which start from a first time domain sending opportunity for sending the request carrying the pilot code as the requesting window of the to-be-requested SI.

4. The method of claim 2, wherein determining the receiving window of the to-be-requested SI according to the receiving window length and the receiving window scheduling periodicity recorded in the scheduling list comprises:

calculating a starting frame of the receiving window of the to-be-requested SI according to an appearance order of the to-be-requested SI in the scheduling list, a scheduling periodicity of the to-be-requested SI, a number of subframes included in each frame, and the receiving window length of each piece of second-class SI;

calculating a starting subframe of the receiving window of the to-be-requested SI according to the appearance order of the to-be-requested SI in the scheduling list, the number of subframes included in each frame, and the receiving window length of each piece of second-class SI; and determining consecutive M subframes starting from the starting subframe as the receiving window of the to-be-requested SI, wherein M refers to the length of the receiving window of the to-be-requested SI.

5. The method of claim 1, wherein when the requesting window is independent from the receiving window of the second-class SI, determining the requesting window of the to-be-requested SI comprises:

analyzing a requesting window length and a requesting window scheduling periodicity of the second-class SI from the first-class SI; and determining the requesting window of the second-class SI according to the requesting window length and the requesting window scheduling periodicity of the second-class SI, wherein the requesting window of the second-class SI is the requesting window of the to-be-requested SI.

6. The method of claim 5, determining the receiving window of the to-be-requested SI comprises:
analyzing a scheduling list of second-class SI from the first-class SI, wherein the scheduling list records a receiving window length and a receiving window scheduling periodicity of the second-class SI;
determining a starting receiving window of the second-class SI according to the receiving window length and the receiving window scheduling periodicity recorded in the scheduling list;
when the starting receiving window of the second-class SI is overlapped with the requesting window of the second-class SI, adjusting the starting receiving window to be located after the requesting window of the second-class SI;
calculating a starting frame of the receiving window of the to-be-requested SI according to the starting receiving window of the second-class SI, an appearance order of the to-be-requested SI in the scheduling list, a scheduling periodicity of the to-be-requested SI, a number of subframes included in each frame, and the receiving window length of each piece of second-class SI;
calculating a starting subframe of the receiving window of the to-be-requested SI according to the appearance order of the to-be-requested SI in the scheduling list, the number of subframes included in each frame, and the receiving window length of each piece of second-class SI; and
determining consecutive M subframes starting from the starting subframe as the receiving window of the to-be-requested SI, wherein M refers to the length of the receiving window of the to-be-requested SI.

7. The method of claim 1, further comprising:
analyzing a time domain sending opportunity offset value A of the requesting window of the to-be-requested SI from the first-class SI;
randomly selecting one time domain sending opportunity from the (1+A)-th to P-th time domain sending opportunities of the requesting window as the Q-th time domain sending opportunity of the requesting window; and
based on the Q-th time domain sending opportunity, executing an operation of monitoring a first Q number of time domain sending opportunities within the requesting window to determine whether the request carrying the pilot code is sent from the user equipment to the base station.

8. The method of claim 1, further comprising:
determining a (1+A)-th time domain sending opportunity of the requesting window as the Q-th time domain sending opportunity of the requesting window, wherein the A refers to an offset value preset by a system or randomly selected by user equipment; or
randomly selecting one time domain sending opportunity from the first to (P−1)-th time domain sending opportunities of the requesting window as the Q-th time domain sending opportunity of the requesting window; and
based on the Q-th time domain sending opportunity, executing an operation of monitoring a first Q number of time domain sending opportunities within the requesting window to determine whether the request carrying the pilot code is sent from the user equipment to the base station.

9. The method of claim 1, further comprising:
when it is monitored that a request carrying a pilot code is sent from user equipment to the base station with the first Q number of time domain sending opportunities of the requesting window, monitoring the receiving window of the to-be-requested SI for the to-be-requested SI sent by the base station.

10. The method of claim 1, further comprising:
when an instruction is received within the receiving window of the to-be-requested SI,
executing an operation of continuing to monitor the to-be-requested SI in a next receiving window according to the instruction; or
requesting the to-be-requested SI from the base station in a unicast manner according to the instruction.

11. A method of sending SI, comprising:
sending first-class SI, wherein the first-class SI carries scheduling information and requesting window information of second-class SI, the scheduling information identifies a receiving window of to-be-requested SI which is applied by user equipment, the requesting window information identifies a requesting window of the to-be-requested SI which is applied by the user equipment, and the to-be-requested SI belongs to the second-class SI;
receiving a request carrying a pilot code of the to-be-requested SI sent by the user equipment within the requesting window of the to-be-requested SI; and
determining whether to send the to-be-requested SI within the receiving window of the to-be-requested SI according to a number of the requests received within the requesting window of the to-be-requested SI,
wherein determining whether to send the to-be-requested SI within the receiving window of the to-be-requested SI according to the number of the requests received within the requesting window of the to-be-requested SI comprises:
determining whether the number is less than a preset number threshold;
when the number is less than the preset number threshold, rejecting sending the to-be-requested SI within the receiving window of the to-be-requested SI; and
when the number is not less than the preset number threshold, sending the to-be-requested SI within the receiving window of the to-be-requested SI.

12. The method of claim 11, further comprising:
when the number is less than the preset number threshold, sending an instruction on a physical downlink control channel.

13. The method of claim 11, wherein sending the to-be-requested SI within the receiving window of the to-be-requested SI comprises:
sending the to-be-requested SI N times within the receiving window of the to-be-requested SI, wherein N indicates a natural number not less than 1.

14. The method of claim 11, further comprising:
setting the scheduling information and the requesting window information for each piece of SI in the second-class SI, wherein the scheduling information comprises a receiving window length and a scheduling periodicity;
adding the scheduling information of second-class SI to a scheduling list in an order, wherein the order is used for the user equipment to calculate a receiving window of the corresponding SI; and
generating the first-class SI according to the scheduling list and the requesting window information.

15. User equipment, comprising:
a processor; and
a memory for storing instructions executable by the processor;
wherein the processor is configured to:
in response to receiving first-class SI broadcasted by a base station, determine a requesting window, a receiving window and a pilot code of to-be-requested SI, wherein the to-be-requested SI belongs to second-class SI, the requesting window comprises P number of time domain sending opportunities, and each time domain sending opportunity corresponds to one subframe associated with an opportunity for sending a request carrying the pilot code;
monitor a first Q number of time domain sending opportunities within the requesting window to determine whether a request carrying the pilot code is sent from user equipment to the base station, wherein P is an integer greater than 1 and Q indicates a natural number less than P;
when it is monitored that no user equipment sends the request carrying the pilot code to the base station with the first Q number of time domain sending opportunities of the requesting window, send the request carrying the pilot code with the (Q+1)-th time domain sending opportunity; and
monitor the receiving window of the to-be-requested SI for the to-be-requested SI sent by the base station.

16. The user equipment of claim 15, wherein the processor is further configured to:
analyze a time domain sending opportunity offset value A of the requesting window of the to-be-requested SI from the first-class SI;
randomly select one time domain sending opportunity from the (1+A)-th to P-th time domain sending opportunities of the requesting window as the Q-th time domain sending opportunity of the requesting window; and
based on the Q-th time domain sending opportunity, execute an operation of monitoring a first Q number of time domain sending opportunities within the requesting window to determine whether the request carrying the pilot code is sent from the user equipment to the base station.

17. The user equipment of claim 15, wherein the processor is further configured to:
determine a (1+A)-th time domain sending opportunity of the requesting window as the Q-th time domain sending opportunity of the requesting window, wherein the A refers to an offset value preset by a system or randomly selected by user equipment; or
randomly select one time domain sending opportunity from the first to (P−1)-th time domain sending opportunities of the requesting window as the Q-th time domain sending opportunity of the requesting window; and
based on the Q-th time domain sending opportunity, execute an operation of monitoring a first Q number of time domain sending opportunities within the requesting window to determine whether the request carrying the pilot code is sent from the user equipment to the base station.

18. The user equipment of claim 15, wherein the processor is further configured to:
when an instruction is received within the receiving window of the to-be-requested SI,
executing an operation of continuing to monitor the to-be-requested SI in a next receiving window according to the instruction; or
requesting the to-be-requested SI from the base station in a unicast manner according to the instruction.

19. A base station, comprising:
a processor; and
a memory for storing instructions executable by the processor;
wherein the processor is configured to execute acts comprising:
sending first-class SI, wherein the first-class SI carries scheduling information and requesting window information of second-class SI, the scheduling information identifies a receiving window of to-be-requested SI which is applied by user equipment, the requesting window information identifies a requesting window of the to-be-requested SI which is applied by the user equipment, and the to-be-requested SI belongs to the second-class SI;
receiving a request carrying a pilot code of the to-be-requested SI sent by the user equipment within the requesting window of the to-be-requested SI; and
determining whether to send the to-be-requested SI within the receiving window of the to-be-requested SI according to a number of the requests received within the requesting window of the to-be-requested SI,
wherein determining whether to send the to-be-requested SI within the receiving window of the to-be-requested SI according to the number of the requests received within the requesting window of the to-be-requested SI comprises:
determining whether the number is less than a preset number threshold;
when the number is less than the preset number threshold, rejecting sending the to-be-requested SI within the receiving window of the to-be-requested SI; and
when the number is not less than the preset number threshold, sending the to-be-requested SI within the receiving window of the to-be-requested SI.

* * * * *